United States Patent [19]

Havens

[11] Patent Number: 5,439,299
[45] Date of Patent: Aug. 8, 1995

[54] SELF-ADJUSTING BEARING SUPPORT

[76] Inventor: Dale I. Havens, 11101 Devils Lake Hwy., Addison, Mich. 49220

[21] Appl. No.: 372,491

[22] Filed: Jan. 13, 1995

[51] Int. Cl.$^6$ .............................................. F16C 19/06
[52] U.S. Cl. ..................................... 384/542; 384/537
[58] Field of Search ............... 384/542, 537, 510, 585, 384/584, 457

[56] References Cited

U.S. PATENT DOCUMENTS

| | | |
|---|---|---|
| 1,027,293 | 5/1912 | Sturt . |
| 1,560,115 | 11/1925 | Smith . |
| 2,638,429 | 5/1953 | Patterson ............................ 154/116 |
| 2,772,127 | 11/1956 | Sborlino . |
| 3,625,580 | 12/1971 | DeHart et al. . |
| 4,235,481 | 11/1980 | Fukuoka et al. . |
| 4,307,921 | 12/1981 | Roberts . |
| 4,461,585 | 7/1984 | Mahrus et al. ...................... 384/288 |

*Primary Examiner*—Lenard A. Footland
*Attorney, Agent, or Firm*—Beaman & Beaman

[57] ABSTRACT

A self adjusting support for anti-friction bearings wherein one half of the circumference of the outer race of the bearing is accurately positioned by a semi-cylindrical recess formed in a bearing support half having a diameter equal to that of the bearing outer race, and the other half of the bearing support comprises a retainer having a semi-cylindrical configuration recess of a larger diameter than the outer race and a deformable wall wherein upon using tension members to draw the bearing support half and retainer toward each other the retainer wall will deform and cause the recess to conform to the diameter of the bearing outer race to accurately maintain the anti-friction bearing within the bearing support permitting the bearing to be firmly held in position without auxiliary cages, bushings or split rings even though significant tolerances may exist between the bearing support and bearing outer race.

6 Claims, 1 Drawing Sheet

SELF-ADJUSTING BEARING SUPPORT

BACKGROUND OF THE INVENTION

1. Field of the Invention

The invention pertains to the supporting of anti-friction bearings, particularly within cast or molded casings having deformable walls, wherein the bearing is firmly supported without separate retainers upon tightening tension members to deform one of the casing configurations into conformity with the bearing outer race.

2. Description of the Related Art

Anti-friction bearings, such as ball bearings, supported within cast or molded casings such as transmission casings, usually employ annular retainers circumscribing the bearing outer race located between the bearing outer race and the bearing receiving recesses located within the casting parts to compensate for manufacturing tolerances occurring within the casing parts. Such retainers may take the from of bushings, sleeves or rings. The use of such bearing retainers is especially required with light duty cast transmissions such as used with lawn and garden equipment, for instance in the head of a grass trimmer. Such light duty transmissions are usually cast of aluminum or similar metal and the transmission casing consists of two sections or halves bolted together after the interior components are assembled. Manufacturing tolerances, or inaccuracies, existing in the casings may prevent the anti-friction bearings from being firmly held within their associated recesses defined in the casings. Accordingly, it is conventional practice to use flexible or deformable annular retainers surrounding the bearings, outer race for location between the outer race and casing recesses to permit the bearing to be firmly frictionally supported within the casings. Such retainers may take the form of split annular bushings such as shown in U.S. Pat. No. 2,772,127. Also, it is known to use "wrap around" supports for bearings, particularly sleeve bearings, wherein the tightening of a screw or bolt draws the support around a circumferential portion of the bearing as shown in U.S. Pat. No. 1,560,115 and 2,638,429. However, such "wrap around" bearing supports are not usable with bolt together casings, and the use of retainers, split bushings, split sleeves and rings and the like to permit anti-friction bearings to be firmly supported within two-part supports or casings adds additional expense to the assembly of bearings within such casings, and may result in inaccuracies in the support of the bearings within the casing.

OBJECTS OF THE INVENTION

It is an object of the invention to provide a support for an anti-friction bearing wherein the bearing may be firmly held within a two-part casing for support without the need for a separate bearing retainer, the practice of the invention permitting the casing to conform itself to an anti-friction bearing outer race as the casing halves are interconnected.

An additional object of the invention is to provide a self-adjusting bearing support for use with two-part casings wherein the wall of at least one of the casings is deformable wherein one casing half is used to accurately position the bearing, while the other casing half automatically conforms to the bearing outer race configuration during tightening of the casing halves together compensating for manufacturing or machining tolerances.

SUMMARY OF THE INVENTION

In the practice of the invention the outer race of a anti-friction bearing is supported within a semi-cylindrical recess located within a bearing support, such as a transmission casing or the like. The diameter of the recess is substantially equal to the diameter of the bearing outer race outer surface wherein the bearing will be accurately received within the semi-cylindrical support recess and the recess will very accurately position the anti-friction bearing and its axis with respect to the support or casing. Normally, the casing will also include a planar parting surface and the axis of the bearing, and the axis of a shaft supported within the bearing, will lie within the plane of the parting surface, the parting surface plane normally defining a diametrical dimension of the support casing recess.

The other component of the support or casing in which the anti-friction bearing is mounted is, hereinafter, usually called the bearing retainer in that its purpose is to retain the anti-friction bearing within the closely fitting semi-cylindrical recess defined in the opposed casing part, and upon tightening of the tension fasteners interconnecting the casing parts or halves the retainer casing will automatically conform to the configuration of the anti-friction bearing outer race firmly gripping and holding the bearing outer race against rotation, and maintaining the bearing within the support casing recess to thereby accurately maintain the desired position and alignment of the bearing and its axis.

The retainer portion of the casing achieves its desired results from the fact that the substantially semi-cylindrical recess for receiving the bearing outer race located therein is of a diameter slightly greater than the diameter of the anti-friction bearing outer race and the associated retainer casing part includes a parting surface opposed to the parting surface of the other casing bearing support which is so located relative to the associated retainer casing half that, during initial assembly of the casing halves the retainer casing half recess engages the bearing outer race at a recess apex and the dimension between the intersection of the retainer support parting surface with the associated recess is greater than the diameter of the anti-friction bearing outer race surface. The plane of the retainer casing parting surface lies between the center of generation of the retainer casing recess and the recess apex as defined midway between the associated parting surface intersections with the recess.

Because of the above dimensional relationship between the retainer casing bearing receiving recess and the anti-friction bearing outer surface the tightening of tensions members, such as screws, extending between the support casing and retainer casing radially spaced from the bearing axis causes the portions of the retainer casing recess between the apex and the parting surface intersections to "wrap around" the anti-friction bearing outer race surface, and the tension members are so related to the retainer casing that radial movement of the retainer casing adjacent its parting surface toward the bearing axis is possible permitting portions of the retainer recess to engage the bearing outer race surface between the recess apex and the parting surface intersections with the associated recess.

The "wrap around" action of the retainer casing is possible due to the deformation of the casing wall adjacent the bearing receiving recess, and as casings utilizing the invention are usually molded or cast of aluminum such limited deformation that occurs to practice the invention does not adversely affect the integrity of the casing wall and as such deformation, dimensionally, is relatively small adverse effects upon the retainer casing half are nil.

The wrapping of the retainer casing recess about the bearing outer race terminates upon the retainer casing recess firmly receiving and fully engaging the bearing outer race, and this relationship occurs before the opposed parting surfaces of the support casing and retainer casing engage, and hence the tighter the tension fasteners are tighten, the greater the frictional grip of the retainer casing upon the anti-friction bearing outer race, and the greater the force imposed upon the bearing by the retainer casing to force the bearing into the support casing recess. Such high frictional forces existing between the bearing outer race surface and the recess surfaces of the support casing and retainer casing accurately locate the bearing relative to the support casing and prevent rotation of the bearing outer race with respect to the casing halves.

Untightening the tension members permits the retainer casing to "expand" to its original dimensions and configuration since the deformation of the retainer casing is well within its elastic limits, and release of the tension members permits the casing halves to be separated and the bearing removed from the support casing for replacement or maintenance.

In the practice of the invention no separate split bushing or bearing retainer is required in that the mere act of assembling the casing halves automatically compensates for manufacturing or machining tolerances to permit the anti-friction bearing to be firmly supported within the coupling halves in an accurate manner.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
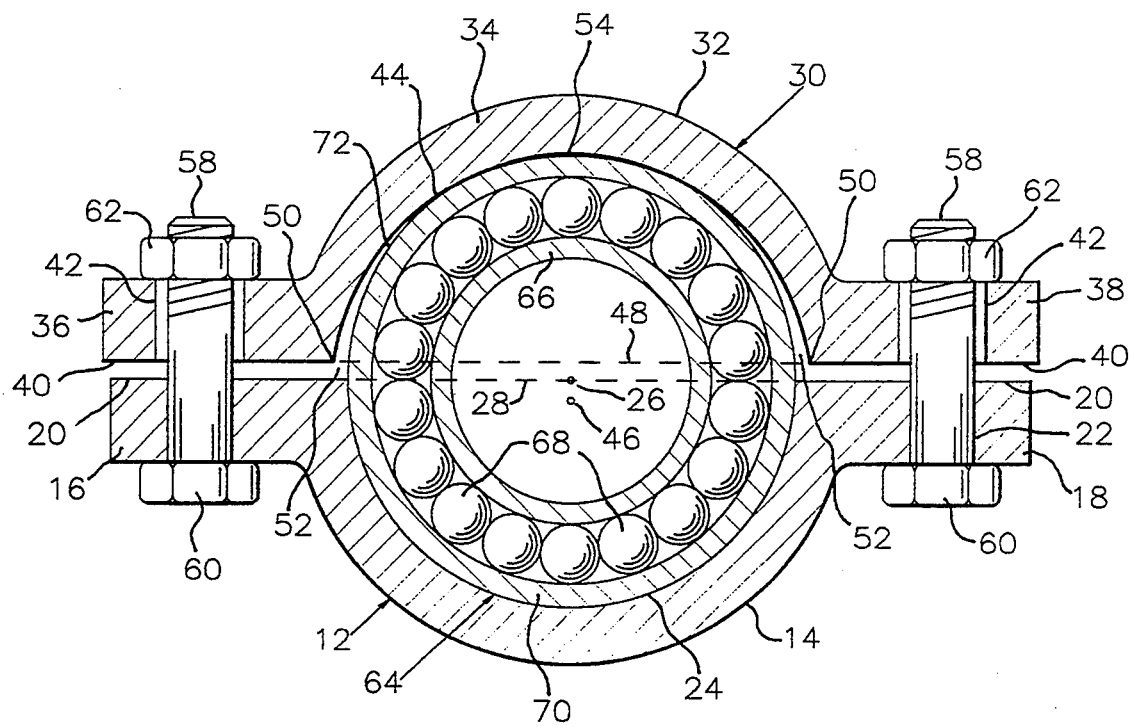
FIG. 1 is an elevational sectional view of an anti-friction bearing located within the bearing support casing, and the retainer casing being preliminarily located upon the bearing prior to the tensioning of the bolts and prior to deformation occurring within the retainer casing.

A complete assembly utilizing the concepts of the invention is indicated in the drawings by reference numeral 10, and this assembly includes a lower support casing 12. The casing 12 may constitute one half of a molded or injected part which is to support an anti-friction bearing, as later described, and it is to be appreciated that the support casing 12, exteriorly, may take a number of configurations depending on the particular utilization thereof. Casings incorporating the inventive concept are usually formed of aluminum, are of a relatively light weight application such as light duty transmissions or bearing supports, and may be formed of aluminum or other readily molded material. It is also to be understood that the inventive concepts could be used with casing materials other than of metal.

The lower support casing 12 includes a convex part 14 having ears 16 and 18 extending away from each other on opposite sides of the casing. The ears are provided with a co-planar parting surface 20 and the parting surface 20 of the ears forms a plane later identified. Bolt holes 22 extend through the ears 16 and 18 and intersect the parting surfaces and plane thereof.

The casing convex part 14 includes a semi-cylindrical bearing recess 24 which, usually, is of a U shaped cross section of a configuration for receiving the outer race of an anti-friction bearing as later described. The center of the bearing and recess 24 is indicated at 26 and lies upon the plane 28 of the ear parting surfaces 20.

It is to be appreciated that the bearing and recess 24 constitutes a true semi-cylindrical configuration. Having its center at 26 wherein the parting surface plane 28 diametrically defines the bearing recess 24.

The upper portion of the bearing supporting casing includes an upper retainer casing portion 30 which has a convex part 32 defined by the wall 34. The retainer casing 30 also includes ears 36 and 38 defined by a parting surface 40 of a planar configuration. Bolt holes 42 defined in the ears 36 and 38 intersect the parting surfaces 40, and it will be appreciated from the drawing that the bolt holes 42 are of a considerably larger diameter than the bolt holes 22 formed in the ears 16 and 18.

A bearing recess 44 is defined within the upper retainer casing 30 on the convex part 32. Preferably, the bearing recess 44 is of a generally semi-cylindrical configuration, but is not completely semi-cylindrical in that the recess has a circumference less than a full 180 degrees. The center of the bearing and recess 44 is indicated at 46 in FIGS. 1 & 2, and it will be appreciated in both figures that the center 46 of recess 44 is "lower" than the center 26 of the recess 24 defined in the lower support casing 12. In FIG. 1, the plane of the parting surfaces 40 is indicated at 48, and in FIG. 1 it will be appreciated that the recess center 46 of recess 44 lies well below the plane 48.

The parting surface 40 of the ears 36 and 38 intersect the bearing recess 44 at intersection lines or corners 50, FIG. 1, and as will be appreciated from FIG. 1, the distance between the intersection lines 50 is greater than the diameter of the bearing recess 24 defined on the lower support casing as measured across diametrical parting plane 28. This greater dimension results in clearance spaces 52 as shown in FIG. 1.

An apex point 54 is defined upon the bearing recess 44 midway between the intersections 50 along the circumference of the recess 44.

The bolts 58 extend through the ear holes 22 and 42, and the bolts 58 each include a hexagonal head 60 and nuts 62 are threaded upon the bolts engaging the ears 36 and 38.

An anti-friction bearing 64 is located within the recesses 24 and 44. The bearing 64 includes a conventional inner race 66, cylindrical ball bearings 68, and an outer race 70 having a cylindrical outer race surface 72.

The diameter of the bearing outer race surface 72 is substantially equal to the diameter of the bearing recess 24 defined in the lower support case 12. Therefore, upon placing the bearing 64 within the bearing recess 24 the bearing will be snugly received within the recess 24 and radially positioned in a very accurate manner with respect to the casing 12.

Of course, to assemble the bearing 64 to the support casing 12 the nuts 62 are removed from the bolts 58 so that the upper retainer casing 30 is removed from the illustrated position. After the bearing 64 is located within the bearing recess 24 the upper retainer casing 30 may be placed over the bearing so that the outer race 70 is received within the bearing recess 44 of retainer casing 30 and the relationship such as shown in FIG. 1 is established upon the nuts 62 being preliminarily threaded upon bolts 58, as shown in FIG. 1.

The diameter of the bearing recess 44 defined in the retainer casing 30 is larger than the diameter of recess 24 of the support casing 12 and the bearing outer race surface 72. Accordingly, when the retainer casing 30 engages the outer race surfaces 72 at apex 54, as shown in FIG. 1, the spaces at 52 will exist between the bearing and recess 44 adjacent the intersection lines 50.

Figure 2:
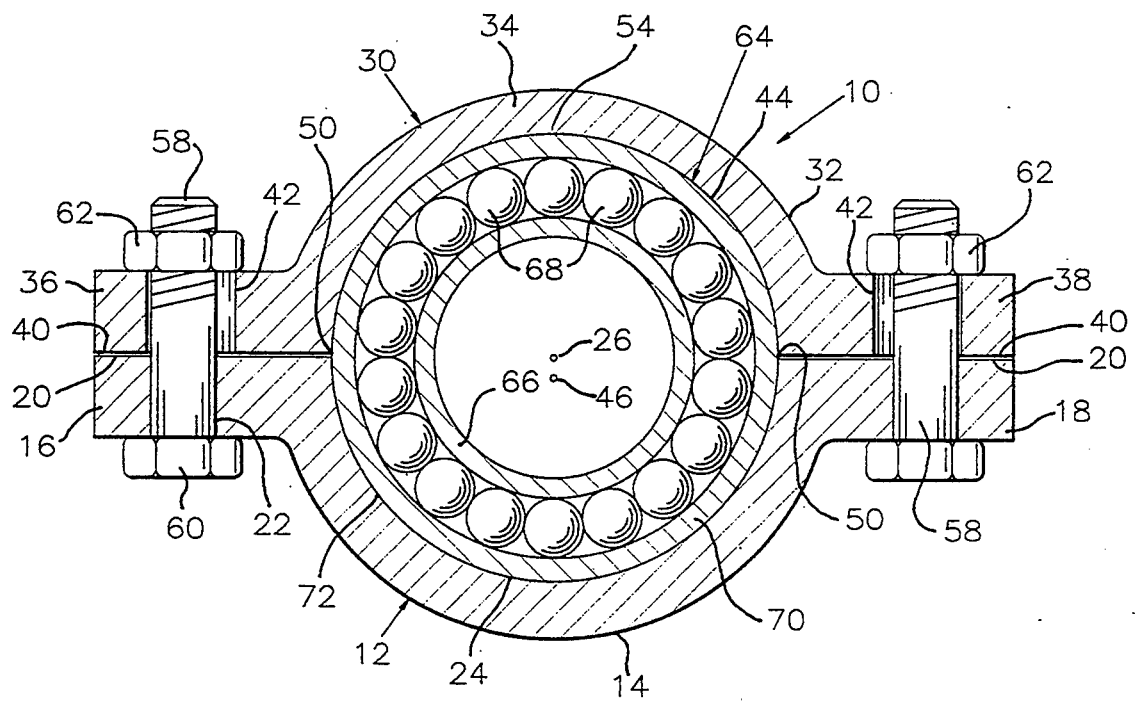
FIG. 2 is an elevational sectional view illustrating the relationship of the components upon tightening of the bolts wherein the retainer casing has deformed itself into configuration with the anti-friction bearing outer race.

As the nuts 62 are tightened the retainer casing 30 and support casing 12 will be drawn toward each other, and the forces imposed upon the retainer casing wall 34 cause the wall 34 to deform diminishing the radial dimension of the spaces 52 and bringing the recess 44 into engagement with the adjacent outer race surface 72. Tightening of the nuts 62 continues until the spaces 52 are eliminated and the bearing recess 44 now conforms to the diameter of the bearing outer race surface 72, is shown in FIG. 2. Of course, the relationship shown in FIG. 2 can only be achieved upon ears 36 and 38 being radially drawn toward each other toward the bearing 64, and it is for this reason that the bolt holes 42 are large enough to accommodate such transverse displacement of the ears 36 and 38.

The diameter of the recess 44 is related to other dimensions of the assembly such that upon the intersections 50 engaging the bearing outer race surface 72 as in FIG. 2, the ear's parting surface 20 and 40 will not engage or "bottom out", but these parting surfaces will be closely related, and if desired, a thin compressible gasket may be located therebetween to render the interior of the assembled casing fluid tight.

As tightening of the nuts 62 will terminate upon the embracing of the outer race 70 by the retainer casing 30 being completed, a firm frictional engagement between the retainer casing 30 and the bearing outer race 70 occurs which prevents relative rotation of the bearing outer race within the recesses 24 and 44. Additionally, the radial forces imposed upon the outer race 70 by the retainer casing 30 in the region of apex 54 forces the outer race 70 into a firm frictional engagement with the lower support casing 12, further preventing relative rotation between the bearing outer race and the casing halves.

Accurate positioning of the bearing 64, and its axis 26, to the assembled casing halves is determined by the close reception of the outer race 70 into the bearing recess 24, and for this reason the support casing 12 is considered to determine the dimensional location and positioning of the bearing, and the shaft, not shown, which will be located within the inner race 66. The tightening of the retainer casing 30 upon the bearing 64 prevents rotation of the bearing relative to the casing halves, and permits the bearing to be firmly held within the casing halves even though molding or machining tolerances exist. The ability of the casing wall 30 to deform to permit an automatic conforming of the outer recess 44 to the outer race surface 72 accommodates casing tolerances, but does not compromise the accuracy of the location of the assembled components.

It is appreciated that various modifications to the inventive concepts will be apparent to those skilled in the art without departing from the spirit and scope of the invention.

I claim:

1. A self adjusting bearing support for supporting an anti-friction bearing having an axis and an outer race outer cylindrical surface concentric to said axis and having a diameter, comprising, in combination, a bearing support half having a semi-cylindrical recess having a longitudinal axis and a diameter substantially equal to the diameter of the bearing outer race outer surface, a planar parting surface defined on said bearing support half diametrically intersecting said recess, said recess axis lying within the plane of said parting surface, the bearing outer race outer surface being closely concentrically receivable within said recess whereby said axes of the bearing and said recess are coincident and said recess determines the radial relationship between the bearing and said bearing support half, a bearing retainer having a deformable wall and having a substantially semi-cylindrical recess having a longitudinal axis and a diameter slightly greater than said bearing support half recess diameter, a planar parting surface defined on said bearing retainer intersecting said recess thereof at opposed intersection corners located on opposite sides of said retainer recess axis, an apex defined on said retainer recess circumferentially midway between said intersection corners, the plane of said retainer parting surface perpendicularly intersecting the retainer recess radius intersecting said retainer recess axis and said apex whereby the shortest distance between said retainer parting surface plane and said apex is slightly less than one-half said retainer recess diameter and the shortest distance between said intersection corners is greater than the diameter of said bearing support half recess, a tension fastener located upon each side of said bearing support half recess interposed between said bearing support half and said bearing retainer upon said parting surfaces thereof being in opposed relationship, tensioning of said tension fasteners drawing said retainer toward said bearing support half whereby a bearing outer race outer surface located within said retainer recess will initially be engaged by said retainer recess apex and the retainer wall will deform to permit said retainer recess to wrap around the bearing outer race outer surface engaged thereby and conform thereto retaining the anti-friction bearing within said bearing support half recess.

2. In a self adjusting bearing support as in claim 1, the diameter of said retainer recess being such that parting surfaces of said bearing support half and said retainer are in adjacent spaced relationship upon completion of tensioning of said tension members and deformation of said retainer wall.

3. In an self adjusting bearing support as in claim 2, said tension fasteners comprising threaded bolts extending through said parting surfaces of said bearing support half and said retainer.

4. A self adjusting bearing support for supporting an anti-friction bearing having an axis and an outer race outer cylindrical surface concentric to said axis and having a diameter, comprising, in combination, a bearing support half having a semi-cylindrical recess having a longitudinal axis and a diameter substantially equal to the diameter of the bearing outer race outer surface, a planar parting surface defined on said bearing support half diametrically intersecting said recess, said recess axis lying within the plane of said parting surface, the bearing outer race outer surface being closely concentrically receivable within said recess whereby said axes of the bearing and said recess are coincident and said recess determines the radial relationship between the bearing and said bearing support half, a bearing retainer having a deformable wall and having a substantially semi-cylindrical diameter slightly greater than said bearing support half recess diameter and having a longitudinal axis, a planar parting surface defined on said bearing retainer intersecting said recess thereof at opposed intersection corners located on opposite sides of said retainer recess axis, the circumferential dimension of said retainer recess being less than one-half of the circumference of the anti-friction bearing outer race outer surface, a tension fastener located upon each side of said bearing support half recess interposed between said bearing support half and said bearing retainer upon said parting surfaces and recesses thereof being in opposed relationship, tensioning of said tension fasteners drawing said retainer toward said bearing support half whereby a bearing outer race located within said support half recess will be engaged by said retainer recess and the retainer wall will deform to wrap around the bearing outer race outer surface engaged thereby and conform thereto retaining the anti-friction bearing within said bearing support half recess.

5. In a self adjusting bearing support as in claim 4, the diameter of said retainer recess being such that said parting surfaces of said bearing support half and said retainer are in adjacent spaced relationship upon completion of tensioning of said tension fasteners and deformation of said retainer wall.

6. In a self adjusting bearing support as in claim 5, said tension members comprising threaded bolts extending through said parting surfaces of said bearing support half and said retainer.

* * * * *